United States Patent [19]

Wilson

[11] Patent Number: 4,729,173
[45] Date of Patent: Mar. 8, 1988

[54] ADJUSTABLE CARPENTER'S SQUARE

[76] Inventor: Dale D. Wilson, 349 Alma Ter., Cary, Ill. 60013

[21] Appl. No.: 46,398

[22] Filed: May 6, 1987

[51] Int. Cl.⁴ .................. B43L 7/06; B43L 13/00
[52] U.S. Cl. ..................... 33/451; 33/456; 33/471
[58] Field of Search .............. 33/421, 451, 452, 453, 33/456, 457, 460, 463, 468, 469, 471

[56] References Cited

U.S. PATENT DOCUMENTS

| | | | |
|---|---|---|---|
| 1,046,362 | 12/1912 | Adams | 33/460 |
| 1,076,095 | 10/1913 | Brown | 33/471 |
| 1,289,047 | 12/1918 | Hall | 33/458 |
| 1,344,269 | 6/1920 | Goodie | 33/468 |
| 1,394,088 | 10/1921 | Heller | 33/471 |
| 1,916,638 | 7/1933 | Rizianu | 33/471 |
| 2,080,792 | 5/1937 | Simmons | 33/453 |
| 3,345,750 | 10/1967 | Hill | 33/451 |

FOREIGN PATENT DOCUMENTS

| | | | |
|---|---|---|---|
| 9491 | 4/1880 | Fed. Rep. of Germany | 33/460 |
| 74401 | 6/1980 | Japan | 33/456 |
| 7134 | of 1905 | United Kingdom | 33/451 |

Primary Examiner—Richard R. Stearns
Attorney, Agent, or Firm—Mathew R. P. Perrone, Jr.

[57] ABSTRACT

An adjustable carpenter's square is formed by having a main beam with a head secured to an upper portion of the main beam with a slide secured to the upper end of the main beam. The head and the slide are partially rotatably secured to the main beam. The head and the slide are slideably and adjustably connected to each other also in addition to being connected to the head.

17 Claims, 5 Drawing Figures

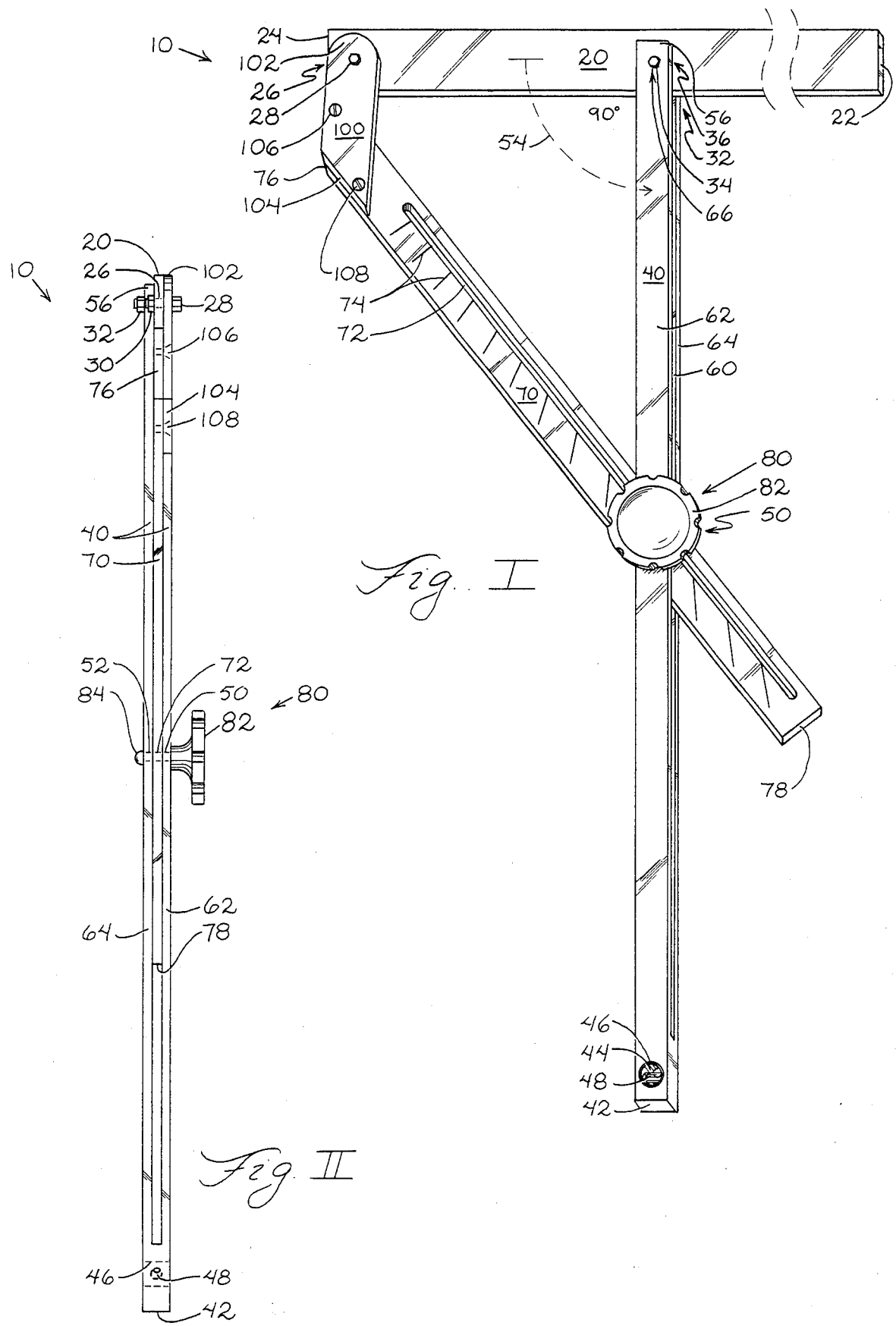

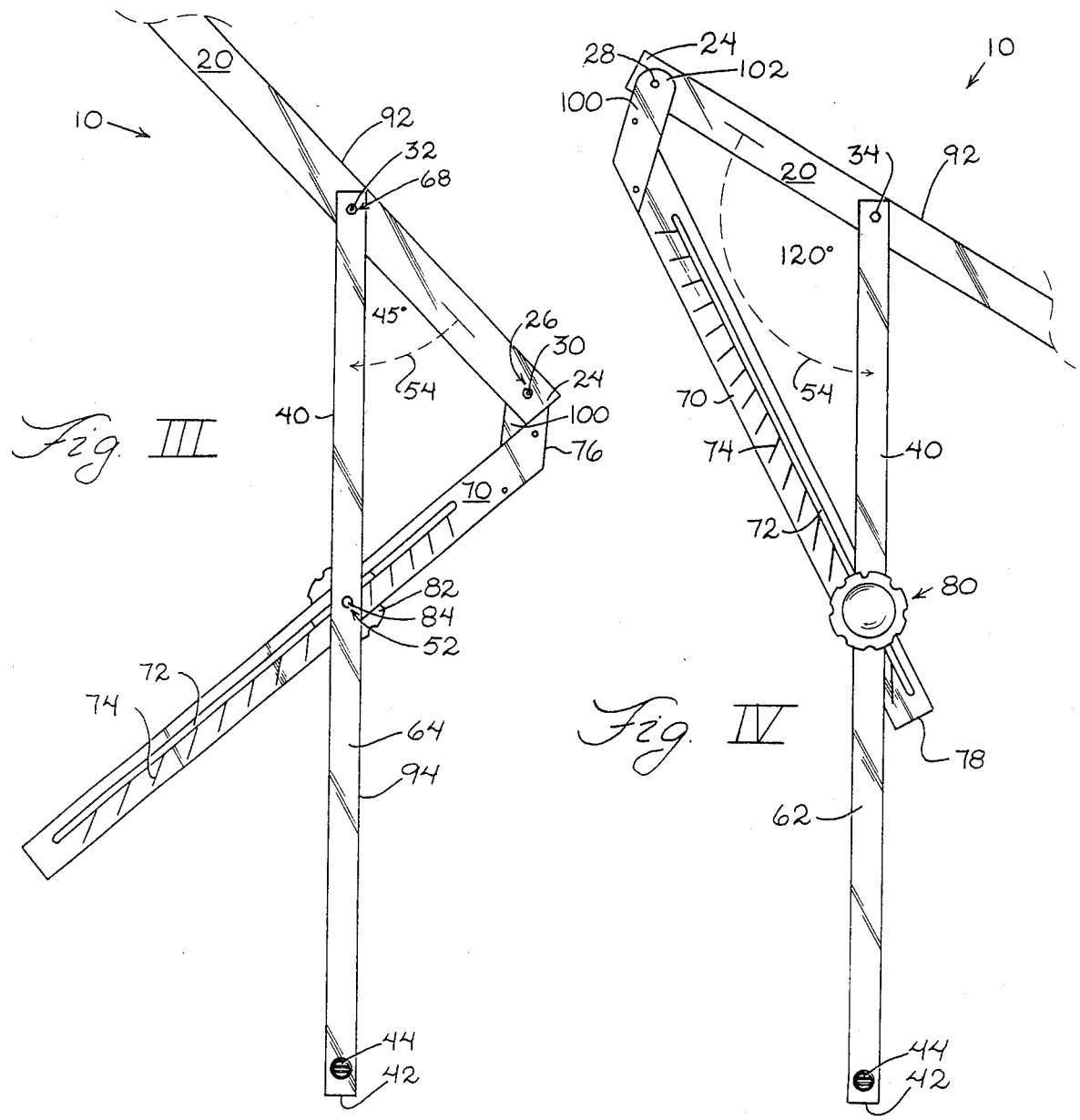
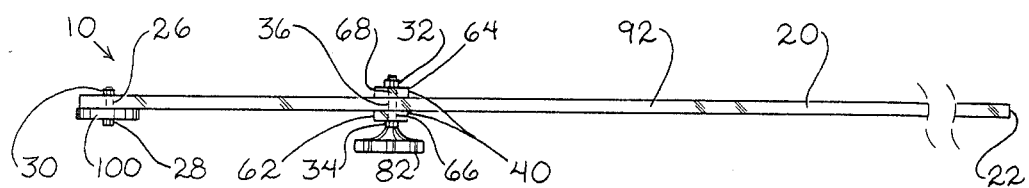

ADJUSTABLE CARPENTER'S SQUARE

BACKGROUND OF THE INVENTION

This invention relates to a carpenter's tool and more particularly to an adjustable carpenter square.

In the construction industry today, it is common to use items having a size of four feet by eight feet. These items include (but are not limited to) wall board, siding, paneling, and siding. It is also customary to use larger sheets of sheet metal for construction purposes.

These large sheets of material cause problems in construction because it is difficult to properly mark for appropriate cuttings to be made. To mark these items requires a long device. Yet many times it is critical to mark a complete line across the full width of the material.

Devices currently used in the prior art are not flexible enough to meet the demands of such marking. Devices which are flexible enough to meet these demands are too small to achieve the desired results. Accordingly, it is clearly desirable to have a device of suitable size and versatility to achieve the appropriate markings on the material. This device must be light and flexible in order to be capable of marking a wide range of angles.

The device must be able to move without impediment through the full range of angles and motions. The device must also have an obstruction free straight edge so that the marking can be done quite simply. Additionally, the device must be easily reversible in order that both left handed and right handed measurement can be made.

It is also desired that the device be simply operated. The design must be therefore be simple to adjust and read. The device must also be practical to manufacture. If such a device can be developed, great benefits can accrue to the construction industry.

SUMMARY OF THE INVENTION

Accordingly, among the many objects of this invention is to provide an adjustable carpenter's square suitable for use on a panel measuring four feet by eight feet.

A further object of this invention is to provide a device to properly mark a large sheet of material.

A still further object of this invention is to provide a device for marking a complete line across the full width of material to be cut.

A still further object of this invention is to provide a device having flexibility to a wide number of marking demands.

Yet a further object of this invention is to provide a device large enough to provide full width marking.

Also an object of this invention is to provide a device capable of moving without impediment through a full range of angles and motions.

Another object of this invention is to provide a device with an obstruction free straight edge.

Yet another object of this invention is to provide a device, which is easily reversible in order to make both left handed and right handed measuments.

Still another object of this invention is to provide a device, which is simply operated.

A further object of this invention is to provide a device which is simple to read.

A still further object of this invention is to provide a device which is simple to adjust.

Yet a further object of this invention is to provide a device, which is practical to manufacture.

These and other objects of the invention are met by providing an adjustable carpenter's square formed by having a main beam with a head secured to an upper portion of the main beam with a slide secured to the upper end of the main beam. The head and the slide are partially rotatably secured to the main beam. The head and the slide are connected together also.

BRIEF DESCRIPTION OF THE DRAWINGS

FIG. I is a front, perspective view of the front of the adjustable carpenter's square 10 of this invention set at ninety (90°) degrees.

FIG. II is a plan, side view of FIG. I.

FIG. III is a plan, rear view of the adjustable carpenter's square 10 of this invention set at forty-five (45°) degrees.

FIG. IV is a plan, front view of the adjustable carpenter's square 10 of this invention set at one hundred twenty (120°) degrees.

FIG. V is a top view of FIG. I.

Throughout the Figures of drawings where the same part appears in more than one Figure of the drawings, the same numeral is applied thereto.

DESCRIPTION OF THE PREFERRED EMBODIMENTS

An adjustable carpenter's square is formed by having a main beam with a head secured to an upper portion of the main beam with an end of the slide secured to the upper end of the main beam. One end of the head is connected to the main beam at a point closer to joinder of the slide and the main beam, than to opposing or base end of the main beam. The head and the slide are partially rotatably secured to the main beam. The head and the slide are connected to each other also in addition to being connected to the head.

As the Figures are interrelated, they are described as a group before going to the specific description of each Figure.

An adjustable carpenter's square 10 is formed by having a main beam 20 with a head 40 movably connected thereto and displaced from an end thereof. The head 40 is connected to the slide 70 near at a point displaced from main beam 20. The slide 70 is adjustable with respect to the main beam 20 and the head 40.

Main beam 20 has a base end 22 and an action end 24 oppositely disposed from base end 22. Main beam 20 is generally a flat metallic bar having sufficient length to be used with larger construction material such as a piece of plywood measuring four feet by eight feet.

At action end 24 of main beam 20 is action aperture 26. Action bolt 28 and action nut 30 cooperate by passing through action aperture 26 to secure slide 70 to main beam 20 at slide link 100. Head 40 is secured to main beam 20 by head nut 32 and head bolt 34 passing through head aperture 36 in main beam 20. Head aperture 36 is displaced from both action aperture 26 and base end 22, and is closer to action aperture 26 than base end 22.

Head 40 has a bubble end 42 and a main end 56. Head 40 has a substantially flat appearance with appropriate apertures therein. Bubble end 42 has a plumb vial aperture 44 which receives a plumb vial mount 46 and contains therein a plumb vial 48 to indicate when head 40 is vertical. The plumb vial 48 is used to indicate when head 40 is held in a perfect vertical position. The plumb vial 48 is a sealed tube containing liquid having a bubble therein. When the bubble is centrally located in the tube, head 40 is perpendicular.

Slide 70 fits through head slot 60. Head 40 has a head slot 60. Head slot 60 is formed by first bar 62 and second bar 64. First bar 62 and second bar 64 are joined at bubble end 42 in a standard fashion. Slide aperture 50 is thus coaxial and in both first bar 62 and second bar 64. Main end 56 is thus open and receives main beam 20 therebetween at head aperture 36. First bar aperture 66 and second bar aperture 68 have the same central axis in order to receive head bolt 34 and secure head 40 to main beam 20 in a partially rotatable fashion.

Within head 40 and displaced from both main end 56 and bubble end 42 is first slide aperture 50, centrally located in first bar 62; and second slide aperture 52, centrally located in second bar 64. First slide aperture 50 and second slide aperture 52 are the apertures for joining head 40 to slide 70 and are usually closer to main end 56 than bubble end 42. First slide aperture 50 and second slide aperture 52 have the same central axis and are joined by by slide assembly 80 to slide 70. Slide 70 includes an adjusting slot 72 running substantially the length of a flat metallic bar forming slide 70.

At one end of slide 70 is an angled end 76 secured in a partially rotatable fashion by means of slide link 100 to main beam 20. Slide 70 is basically a flat bar with an appropriate angle cut at angled end 76 to achieve proper function and joinder. Oppositely disposed from angled end 76 is flat end 78 for the purpose of forming slide 70. Slide 70 is a slotted, flat metallic bar. Slide 70 also has graduated markings 74 for indicating the positioning of the angle.

Slide 70 is movably held in place on head 40 by slide assembly 80. Slider assembly 80 includes knob 82 for releasing or securing slide assembly 80. A lock bolt 84 is secured to knob 82 and passes through first slide aperture 50, then through adjusting slot 72 and then through second slide aperture 52. Lock bolt 84 permits the slide 70 to be locked in place within first bar 62 and second bar 64, when the knob 82 is tightened.

Knob 82 is adjacent first bar 62. Knob 82 may be replaced by any suitable hand tightening device for convenience. What is critical is that the adjustment be easily made.

The slide link 100 joins slide 70 to main beam 20. Slide link 100 has a rounded end 102 secured to main beam 20 by acton nut 30 and action bolt 28. In this fashion, slide link 100 is rotatably mounted to main beam 20. Oppositely disposed from rounded end 102 of slide link 100 is fastened end 104. Fastened end 104 is secured to slide 70 by first slide screw 106 and second slide screw 108 in order to achieve a fixed attachment. In this fashion, slide 70 may rotate around action bolt 28.

Head 40 rotates around head bolt 34. The action of lock bolt 84 permits head 40 to be adjusted to angles ranging from about 10° to 125° when measured on head 40 in relationship to main beam 20. Head angle 54 measures the angle between head 40 and main beam 20. With this linkage and with the graduation, the size of this adjustable carpenter's square permits careful drawing of lines on large pieces of construction material. In this fashion, the carpenter's work is greatly simplified.

Referring now to FIG. I, head 40 is at a right angle with main beam 20. Graduated markings 74 indicate the angle settings that may be set on adjustable carpenter's square 10. Of course, other markings may be used in combination therewith or in place thereof. This indicates the flexibility of adjustable carpenter's square 10.

In FIG. II, an end view of FIG. I is depicted to show a good side view of knob 82. The streamlined view of adjustable carpenter's square 10 shows the ability of the device to provide an unencumbered straight edge for marking purposes.

With FIG. III, a plan, rear view of FIG. I is shown with with a first marking edge 92 on main beam 20 and a second marking edge 94 on slide 70 capable of making a forty five (45°) angle mark. Any straight edge of adjustable square 10 may be used for marking. However, marking edge 94 is usually the primary marking edge. Graduated markings 74 similar to those of FIG. I are depicted herein also.

FIG. IV is a plan, front view of adjustable carpenter's square 10 set to make a one hundred twenty (120°) degree angle.

FIG. V is a top end view showing first marking edge 92.

Adjustable carpenter's square 10 is formed from flat, long bars of metal. Generally the metal is aluminum to preserve the light weight requirement of the invention. Thus main beam 20, head 40 and slide 70 are all flat long metallic bars. The slide link 100 is also a flat bar contoured to match main beam 20 and slide 70 as it serves the joinder function.

When using adjustable carpenter's square 10, it must be remembered that this is an adjustable square with a wide range of adjustment with increments from 10° to more than 125°. It is made mostly of aluminum because of its lightweight and its resistance to corrosion. It is simple to use and can be used on a wide variety of building materials, such as siding, drywall and paneling.

There are three ways to set or adjust the square. One way for example, assuming a project of siding project using four feet by eight feet construction material such as siding, a cut must be made so that the material will fit the roof line. If the roof pitch is known, the square 10 can be present by using the increments stamped into the slide 70 at first marking edge 92 or second marking edge 94, by moving the head 40 to the desired angle, and locking it in place. The square 10 can be set onto the siding, and the angle transferred onto the siding. To do this, the head 40 of the square 10 is simply hooked on the edge of the siding to the desired height, and the line is drawn along the second edge 94.

A second way to adjust square 10 is to copy the angle. The angle is copied by placing the first edge 92 of main beam 20 up against the bottom of the roof sheathing and the head 40 against the edge of a stud or sheet of siding. Now, the square 10 is simply locked into position, and it is ready to be used.

A third way of adjusting the square 10 is similar to copying an angle. The main beam 20 with first marking edge 92 is placed against the object to be copied, and the head 40 is set to a plumb position (using the plumb vial 48 built into the head 40).

The square 10 can be used in a left or right hand position depending on the situation.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent of the United States is:

1. An adjustable square for use by a carpenter with larger construction material, said square including a main beam, a head, and a slide, wherein:
   a. said main beam, said head and said slide are each formed from a separate, long, flat bar; and interconnected to cooperate;
   b. said main beam has a base end, and an action end oppositely disposed from said base end;
   c. said slide has an angled end and a flat end oppositely disposed from said angled end;
   d. said head has a first end and a main end oppositely disposed from said first end;
   e. a rotating means secures said angled end of said slide to said action end of said main beam in a partially rotatable fashion;
   f. said slide has a slide slot therein; and
   g. a movable means secures said main end of said head to said main beam at a joinder point in a movable relationship, with said joinder point being displaced from said action end, and closer to said action end than said base end.

2. The adjustable square of claim 1, wherein:
   a. an adjusting means secures said slide to said head so that said slide is adjustable with respect to said main beam and said head;
   b. said head has a plumb vial secured in said first end to form a bubble end perpendicular to a length of said head; and
   c. said bar is substantially flat, rectangular, and metallic.

3. The adjustable square of claim 2, wherein:
   a. said action end of said main beam includes an action aperture;
   b. an action bolt and an action nut cooperate by passing through said action aperture to secure said slide to said main beam;
   c. said head is secured to said main beam by a head nut and head bolt passing through a head aperture in said main beam; and
   d. said head aperture is displaced from both said action aperture and said base end, and is closer to said action aperture than said base end.

4. The adjustable square of claim 3, wherein:
   a. a slide aperture is within said head between said action aperture and said bubble end;
   b. said slide aperture permits said head to be joined to said slide;
   c. said slide includes an adjusting slot running substantially the length thereof;
   d. said slide fits through a head slot in said head;
   e. said head slot is formed by a first bar and a second bar to form said head;
   f. said main end of said head is open and receives said main beam between said first bar and said second bar; and
   g. a first bar aperture is in said first bar and a second bar aperture in said second bar, said first bar and said second bar having a common axis in order to receive a head bolt and secure said head to said main beam between said first bar and said second bar.

5. The adjustable square of claim 4, wherein:
   a. a slide fastening mechanism fixes a position for said slide on said head;
   b. said slide fastening mechanism is hand-operated to provide for adjustment of said adjustable square to a desired position; and
   c. a slide link movably secures said slide to said main beam.

6. The adjustable square of claim 5, wherein:
   a. said slide link has a rounded end movably secured to said main beam;
   b. said slide link has a fastened end secured to said slide;
   c. said rounded end is partially rotatable about an action bolt secured to said main beam; and
   d. said head is partially rotatable about said main beam.

7. The adjustable square of claim 6, wherein:
   a. said bubble end of said head includes a vertically mounted plumb vial;
   b. said slide fastening mechanism includes a knob for releasing or securing said slide fastening mechanism;
   c. a slide bolt is secured to said knob;
   d. a slide aperture in said head aligned to fit said first bar and said second bar receives said slide bolt;
   e. a holding nut is secured at said second bar to receive said slide bolt; and
   f. said slide bolt is a lock bolt.

8. The adjustable square of claim 7, wherein:
   a. said knob is adjacent said first bar;
   b. said slide link is secured to said main beam by an action nut and an action bolt to partially rotatably mount said slide link to said main beam;
   c. said slide link has a fastened end oppositely disposed from said rounded end;
   d. said fastened end is secured to said slide; and
   e. said slide is graduated.

9. The adjustable square of claim 2, wherein:
   a. a slide fastening mechanism fixes a position for said slide on said head;
   b. said slide fastening mechanism is hand-operated to provide for adjustment of said adjustable square to a desired position; and
   c. a slide link movably secures said slide to said main beam.

10. The adjustable square of claim 9, wherein:
    a. said slide is adjustable with respect to said main beam and said head;
    b. said head has a plumb vial secured in said bubble end perpendicular to a length of said head; and
    c. said main beam is a substantially flat, rectangular, metallic bar.

11. The adjustable square of claim 10, wherein:
    a. a slide aperture is within said head between said main end and said bubble end;
    b. said slide aperture permits said head to be joined to said slide;
    c. said slide includes an adjusting slot running substantially the length thereof;
    d. said slide fits through a head slot in said head;
    e. said head slot is formed by a first bar and a second bar to form said head;
    f. said main end of said head is open and receives said main beam between said first bar and said second bar; and
    g. a first bar aperture is in said first bar and a second bar aperture in said second bar, said first bar and said second bar having a common axis in order to receive a head bolt and secure said head to said main beam between said first bar and said second bar.

12. The adjustable square of claim 11, wherein:
   a. said slide link has a rounded end movably secured to said main beam;
   b. said slide link has a fastened end secured to said slide;
   c. said rounded end is partially rotatable about an action bolt secured to said main beam; and
   d. said head is partially rotatable about said main beam.

13. The adjustable square of claim 12, wherein:
   a. said bubble end of said head includes a vertically mounted plumb vial;
   b. said slide fastening mechanism includes a knob for releasing or securing said slide fastening mechanism;
   c. a slide bolt is secured to said knob;
   d. a slide aperture in said head aligned to fit said first bar and said second bar receives said slide bolt;
   e. a holding nut is secured at said second bar to receive said slide bolt; and
   f. said slide bolt passes through a cylinder, then through said adjusting slot and then through said slide aperture to meet with said holding nut.

14. The adjustable square of claim 13 wherein:
   a. said knob is adjacent said first bar;
   b. said slide link is secured to said main beam by an action nut and an action bolt to rotatably mount said slide link to said main beam;
   c. said slide link has a fastened end oppositely disposed from said rounded end;
   d. said fastened end is secured to said slide; and
   e. said slide is graduated.

15. The adjustable square of claim 14, wherein:
   a. said action end of said main beam includes an action aperture;
   b. an action bolt and an action nut cooperate by passing through said action aperture to secure said slide to said main beam;
   c. said head is secured to said main beam by a head nut and head bolt passing through a head aperture in said main beam; and
   d. said head aperture is displaced from both said action aperture and said base end, and is closer to said action aperture than said base end.

16. An adjustable square for use by a carpenter with larger construction material, said square including a main beam, a head, and a slide, wherein:
   a. said main beam has a base end, and an action end oppositely disposed from said base end;
   b. said slide has an angled end secured in a partially rotatable fashion to said action end of said main beam;
   c. said slide has a flat end oppositely disposed from said angled end;
   d. said slide has a slide slot therein;
   e. said head has a bubble end and a main end;
   f. said main end is movably secured to said main beam at joinder point displaced from said action end, and closer to said action end than said base end;
   g. said slide is adjustable with respect to said main beam and said head;
   h. said head has a plumb vial secured in said bubble end perpendicular to a length of said head;
   i. said main beam is a substantially flat, rectangular, metallic bar;
   j. said action end of said main beam includes an action aperture;
   k. an action bolt and an action nut cooperate by passing through said action aperture to secure said slide to said main beam;
   l. said head is secured to said main beam by a head nut and head bolt passing through a head aperture in said main beam;
   m. said head aperture is displaced from both said action aperture and said base end, and is closer to said action than said base end;
   n. a slide aperture is within said head between said main end and said bubble end;
   o. said slide aperture permits said head to be joined to said slide;
   p. said slide includes an adjusting slot running substantially the length thereof;
   q. said slide fits through a head slot in said head;
   r. said head slot is formed by a first bar and a second bar to form said head;
   s. said main end of said head is open and receives said main between said first bar and said second bar;
   t. a first bar aperture is in said first bar and a second bar aperture in said second bar, said first bar and said second bar having a common axis in order to receive a head bolt and secure said head to said main beam between said first bar and said second bar;
   u. a slide fastening mechanism fixes a position for said slide on said head;
   w. said slide fastening mechanism is hand-operated to provide for adjustment of said adjustable square to a desired position; and
   x. a slide link movably secures said slide to said main beam.

17. The adjustable square of claim 16, wherein:
   a. said slide link has a rounded end movably secured to said main beam;
   b. said slide link has a fastened end secured to said slide;
   c. said rounded end is partially rotatable about an action bolt secured to said main beam;
   d. said head is partially rotatable about said main beam;
   e. said bubble end of said head includes a vertically mounted plumb vial;
   f. said slide fastening mechanism includes a knob for releasing or securing said slide fastening mechanism;
   g. a slide bolt is secured to said knob;
   h. a slide aperture in said head aligned to fit said first bar and said second bar receives said slide bolt;
   i. a holding nut is secured at said second bar to receive said slide bolt;
   j. said slide bolt is a lock bolt passing through said adjusting slot and then through said slide aperture;
   k. said knob is adjacent said first bar;
   l. said slide link is secured to said main beam by an action nut and an action bolt to rotatably mount said slide link to said main beam;
   m. said slide link has a fastened end oppositely disposed from said rounded end;
   n. said fastened end is secured to said slide; and
   o. said slide is graduated.

* * * * *